United States Patent
Sen et al.

(10) Patent No.: US 9,235,406 B2
(45) Date of Patent: Jan. 12, 2016

(54) METHODS AND APPARATUS FOR USER IDENTITY MODULE UPDATE WITHOUT SERVICE INTERRUPTION

(71) Applicant: Apple Inc., Cupertino, CA (US)

(72) Inventors: Abhishek Sen, San Jose, CA (US); Prashant H. Vashi, Cupertino, CA (US); Karthik Anantharaman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 13/632,979

(22) Filed: Oct. 1, 2012

(65) Prior Publication Data

US 2013/0283257 A1    Oct. 24, 2013

Related U.S. Application Data

(60) Provisional application No. 61/637,762, filed on Apr. 24, 2012.

(51) Int. Cl.
*G06F 15/16* (2006.01)
*G06F 9/445* (2006.01)
*H04W 24/02* (2009.01)
*H04W 8/20* (2009.01)

(52) U.S. Cl.
CPC ............... *G06F 8/67* (2013.01); *H04W 24/02* (2013.01); *H04W 8/205* (2013.01)

(58) Field of Classification Search
CPC ....... H04W 12/06; H04W 12/08; H04W 4/16; H04W 8/183; H04M 3/56; H04L 63/08; H04L 63/104; G06F 8/67
See application file for complete search history.

(56) References Cited

U.S. PATENT DOCUMENTS

| | | | | |
|---|---|---|---|---|
| 7,185,362 | B2 * | 2/2007 | Hawkes ................. | G06F 21/10 380/201 |
| 7,574,510 | B2 * | 8/2009 | Kalofonos et al. ............ | 709/228 |
| 7,607,013 | B2 * | 10/2009 | Liu et al. ....................... | 713/168 |
| 7,778,670 | B2 * | 8/2010 | Kim ................ | H04M 1/274516 455/414.1 |
| 8,555,067 | B2 | 10/2013 | Schell et al. | |
| 8,660,608 | B2 | 2/2014 | Schell et al. | |
| 8,671,365 | B2 * | 3/2014 | Berus ........................... | 715/861 |
| 8,707,022 | B2 | 4/2014 | Haggerty et al. | |
| 8,838,174 | B2 * | 9/2014 | Sen ....................... | H04W 8/183 455/418 |
| 8,869,242 | B2 * | 10/2014 | Malinen ................. | H04L 63/08 380/247 |
| 8,913,992 | B2 | 12/2014 | Schell | |
| 8,924,715 | B2 | 12/2014 | Schell et al. | |
| 8,996,002 | B2 | 3/2015 | Rodgers et al. | |
| 9,009,475 | B2 | 4/2015 | Hauck et al. | |
| 9,100,393 | B2 | 8/2015 | Schell et al. | |

(Continued)

OTHER PUBLICATIONS

Wang et al., CS-DRM: a cloud-based SIM DRM scheme for mobile internet, Jan. 2011, 19 pages.*

(Continued)

*Primary Examiner* — Thuy Dao
(74) *Attorney, Agent, or Firm* — Downey Brand LLP (57) ABSTRACT

Methods and apparatus for accepting software updates without interruption of ongoing services. Various embodiments are adapted for maintaining service continuity in multi-mode devices such as cellular devices. In one exemplary implementation, unlike prior art solutions (which interrupt user identity module software to implement changes to the network access software), unnecessary updates can be postponed or otherwise scheduled so as to minimize or eliminate service or user experience impact.

16 Claims, 7 Drawing Sheets

(56) References Cited

U.S. PATENT DOCUMENTS

| | | |
|---|---|---|
| 9,100,810 B2 | 8/2015 | Schell et al. |
| 2006/0010251 A1* | 1/2006 | Mrsic-Flogel et al. ....... 709/245 |
| 2006/0075269 A1* | 4/2006 | Liong et al. ................... 713/300 |
| 2009/0181662 A1 | 7/2009 | Fleischman et al. |
| 2010/0227588 A1* | 9/2010 | Bradley .............. H04L 63/0209 455/411 |
| 2010/0330904 A1* | 12/2010 | Stougaard .................... 455/41.1 |
| 2011/0269423 A1 | 11/2011 | Schell et al. |
| 2012/0108206 A1 | 5/2012 | Haggerty |
| 2012/0108295 A1 | 5/2012 | Schell et al. |
| 2012/0260095 A1 | 10/2012 | Von Hauck et al. |
| 2012/0289197 A1* | 11/2012 | Holtmanns ........... H04W 8/183 455/411 |

OTHER PUBLICATIONS

Universal Mobile Telecommunications System (UMTS); LTE; Characteristics of the Universal Subscriber Identity Module (USIM) application (3GPP TS 31.102 version 9.11.0 Release 9) (Oct. 2012).

CDMA Card Application Toolkit (CCAT); 3GPP2 C.S0035-A, Version 2; Aug. 2007.

Smart Cards; Card Application Toolkit (CAT) (Release 9); ETSI TS 102 223 V9.0.0 (Oct. 2009).

\* cited by examiner

METHODS AND APPARATUS FOR USER IDENTITY MODULE UPDATE WITHOUT SERVICE INTERRUPTION

RELATED APPLICATIONS

This application claims priority to co-owned, U.S. Provisional Patent Application Ser. No. 61/637,762 filed on Apr. 24, 2012 of the same title, the foregoing being incorporated herein by references in its entirety.

This application is also related to co-owned, co-pending U.S. patent application Ser. No. 13/080,558 filed on Apr. 5, 2011, and entitled "APPARATUS AND METHODS FOR CONTROLLING DISTRIBUTION OF ELECTRONIC ACCESS CLIENTS", Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 12/980,232 filed on Dec. 28, 2010 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", and U.S. Provisional Patent Application Ser. Nos. 61/472,109 filed Apr. 5, 2011 and entitled "APPARATUS AND METHODS FOR STORING ELECTRONIC ACCESS CLIENTS" (now U.S. patent application Ser. No. 13/093,722 filed on Apr. 25, 2011, of the same title), 61/472,115 filed on Apr. 5, 2011, and entitled "APPARATUS AND METHODS FOR DISTRIBUTING AND STORING ELECTRONIC ACCESS CLIENTS" (now U.S. patent application Ser. No. 13/095,716 filed on Apr. 27, 2011, of the same title), 61/407,858 filed on Oct. 28, 2010 and entitled "METHODS AND APPARATUS FOR ACCESS CONTROL CLIENT ASSISTED ROAMING" (now U.S. patent application Ser. No. 13/109,851 filed on May 17, 2011, of the same title), 61/407,861 filed on Oct. 28, 2010 and entitled "MANAGEMENT SYSTEMS FOR MULTIPLE ACCESS CONTROL ENTITIES" (now U.S. patent application Ser. No. 13/079,614 filed on Apr. 4, 2011, of the same title"), 61/407,862 filed on Oct. 28, 2010 and entitled "METHODS AND APPARATUS FOR DELIVERING ELECTRONIC IDENTIFICATION COMPONENTS OVER A WIRELESS NETWORK" (now U.S. patent application Ser. No. 13/111,801 filed on May 19, 2011, of the same title), 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title), 61/408,504 filed on Oct. 29, 2010 and entitled "ACCESS DATA PROVISIONING SERVICE" (now U.S. patent application Ser. No. 13/078,811 filed on Apr. 1, 2011, and entitled "ACCESS DATA PROVISIONING APPARATUS AND METHODS"), 61/409,891 filed on Nov. 3, 2010 and entitled "METHODS AND APPARATUS FOR ACCESS DATA RECOVERY FROM A MALFUNCTIONING DEVICE" (now U.S. patent application Ser. No. 13/287,874 filed on Nov. 2, 2011, of the same title), 61/410,298 filed on Nov. 4, 2010 and entitled "SIMULACRUM OF PHYSICAL SECURITY DEVICE AND METHODS" (now U.S. patent application Ser. No. 13/080,533 filed on Apr. 5, 2011, of the same title), and 61/413,317 filed on Nov. 12, 2010 and entitled "APPARATUS AND METHODS FOR RECORDATION OF DEVICE HISTORY ACROSS MULTIPLE SOFTWARE EMULATION" (now U.S. patent application Ser. No. 13/294,631 filed on Nov. 11, 2011, of the same title), each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of mobile technology and wireless communications. More particularly, one exemplary embodiment is directed to performing user identity module software updates without interruption of ongoing services.

2. Description of Related Technology

Existing mobile devices terminate all running services to update user identity module (UIM) components. Traditionally, this ensured that a mobile device would access the network with the most current UIM software.

However, given the recent growth in multi-mode device popularity, indiscriminately terminating all running services to perform UIM updates can dramatically affect user experience. Specifically, receiving a UIM update for inactive network access software ideally should not trigger a termination event for all running services of the device.

Accordingly, improved methods and apparatus are needed for performing software (e.g., UIM software) updates that do not exhibit such indiscriminant behavior and hence do not adversely impact user service continuity or user experience.

SUMMARY

The present disclosure provides, inter alia, improved apparatus and methods for performing user identity module software updates without interruption of ongoing services.

A user apparatus is disclosed. In one embodiment, the user apparatus includes: a wireless transceiver configured to communicate with a wireless network; a processor; a storage device in communication with the processor; and computerized logic configured to accept software updates from the wireless network without interruption of one or more ongoing services, the logic configured to: execute a plurality of user identity module (UIM) software; receive one or more updates for one or more UIM software; determine whether the one or more updates are relevant to at least one active network connection; when the one or more updates are relevant to the at least one active network connection, refresh the one or more updates; and when the one or more updates are not relevant to the at least one active network connection, refresh the one or more updates once the at least one active network connection is terminated.

In one variant, the relevance to the at least one active network connection is determined based on a comparison between to the at least one active network connection and a network connection on which the one or more updates were received.

In a second variant, the relevance to the at least one active network connections is based on one or more parameters provided with the received one or more updates.

In a third variant, the one or more UIM software is configured to run at least first and second contexts; and the refreshed one or more updates are performed on the first context and the second context is configured to maintain the at least one active network connection.

In a fourth variant, the second context is refreshed with the one or more updates upon a termination of the active network connection.

A method for performing user identity module (UIM) software updates without interrupting ongoing services is disclosed. In one embodiment, the method includes: receiving at least one or more software updates for at least one user identity module (UIM) software over one or more network interfaces of a mobile device; determining an association between the received at least one or more software updates and at least one of the one or more network interfaces of the mobile device; and updating the at least one UIM software based on the determination.

In one variant, the determining comprises identifying if the at least one or more networks interfaces associated with the received at least one or more software updates has an active network connection.

In another variant, the updating occurs without disabling any active network interfaces which are not associated with the received at least one or more software updates.

In a third variant, the received at least one or more software updates include one or more parameters that identify an associated one or more network interfaces.

In a fourth variant, the association between the received at least one or more software updates is determined based on one or more parameters provided with the received at least one or more software updates.

In a fifth variant, the at least one UIM software is configured to: verify the user identity of a communicating party, and grant a level of access commensurate with the verified user identity.

A non-transitory computer readable apparatus for use in a mobile device is disclosed. In one embodiment, the computer readable apparatus includes a plurality of instructions that when executed by a digital processor, cause the digital processor to: execute one or more user identity module (UIM) software configured to authenticate and/or authorize a user for access to a corresponding one or more networks; receive one or more updates for one or more user identity module (UIM) software; and based on conditional input from the mobile device, refresh the one or more updates for a first network without interrupting operation of a second network.

In one variant, the conditional input is based at least in part on parameters received with the one or more updates.

In a second variant, the conditional input is based at least in part on a network interface used to receive the one or more updates.

In a third variant, the first network operation is interrupted during the refresh of the one or more updates.

In a fourth variant, the received one or more updates for one or more UIM software are only associated with the first network.

A method of operating a network is disclosed. In one embodiment, the method includes: maintaining a plurality of active network connections to a corresponding plurality of user devices; transmitting one or more updates for at least one user identity module (UIM) software associated with at least one user device; and where the transmitting causes the at least one user device to: refresh the one or more updates when the one or more updates are relevant to the active network connection; and otherwise, refresh the one or more updates once the active network connection is terminated.

A network apparatus is disclosed. In one embodiment, the network apparatus includes: a wireless transceiver configured to communicate with a plurality of user devices; a processor; a storage device in communication with the processor; and computerized logic configured to provide software updates to the plurality of user devices without interrupting one or more ongoing services, the logic configured to: maintain a plurality of active network connections to a corresponding plurality of user devices; transmit one or more updates for at least one user identity module (UIM) software associated with at least one user device; where the transmission causes the at least one user device to: refresh the one or more updates when the one or more updates are relevant to the active network connection; and otherwise refresh the one or more updates once the active network connection is terminated.

A non-transitory computer readable apparatus for use in a network apparatus is disclosed. In one embodiment, the computer readable apparatus includes: a plurality of instructions that when executed by a digital processor, cause the digital processor to: maintain a plurality of active network connections to a corresponding plurality of user devices; transmit one or more updates for one or more user identity module (UIM) software to at least one user device of the plurality of user devices; and where the one or more updates are associated with an inactive network.

In one variant, the transmission of the one or more updates does not interrupt the maintained active network connections.

A user apparatus is disclosed. In one embodiment, the apparatus includes: a processor; a storage device in communication with the processor; and computerized logic configured to accept software updates without interruption of one or more ongoing services. In one variant, the user apparatus is a mobile cellular device, and the logic is specifically configured to: receive one or more updates for one or more network access software; determine whether the one or more updates are relevant to at least one currently active network connection; when the one or more updates are relevant to the at least one currently active network connection, refresh the one or more updates; and/or when the one or more updates are not relevant to the at least one currently active network connection, refresh the one or more updates once the at least one currently active network connection is terminated.

In another variant, the logic is configured to: receive one or more updates for one or more network access software; determine whether the one or more updates are relevant to at least one currently active network connection; when the one or more updates are relevant to the at least one currently active network connection, refresh the one or more updates; and/or when the one or more updates are not relevant to the at least one currently active network connection, concurrently maintain the at least one currently active network connections while simultaneously refreshing the one or more updates.

A non-transitory computer-readable medium is disclosed. In one embodiment, the non-transitory computer-readable storage media includes instructions which when executed by the processor: execute one or more network access software configured to authenticate and/or authorize a user for access to a corresponding one or more networks; and receive one or more updates for one or more network access software; and based on conditional input from the client device, refresh the one or more updates for a first network without interrupting operation of a second network.

A system for performing user identity module software updates without interruption of ongoing services is disclosed.

A network apparatus configured for providing user identity module software updates to a mobile device such that the updates can be performed without interruption of ongoing services is disclosed. In one embodiment, the network apparatus includes a server or other network entity capable of configuring the updates with metadata or other relevant information for use by the mobile device.

Other features and advantages principles described hereinafter will immediately be recognized by persons of ordinary skill in the art with reference to the attached drawings and detailed description of exemplary embodiments as given below.

All Figures© Copyright 2012 Apple Inc. All rights reserved.

DETAILED DESCRIPTION

Reference is now made to the drawings, wherein like numerals refer to like parts throughout.

Overview

Existing mobile devices terminate all running services to update user identity module (UIM) components. Traditionally, this ensured that a mobile device would access the network with the most current UIM software. Prior art solutions did not frequently require updates to UIM operation. However, given the recent growth in multi-mode device popularity, indiscriminately terminating all running services to perform any UIM updates can dramatically affect user experience. Specifically, receiving a UIM update for inactive network access software should not trigger a termination event for all running services of the device.

Accordingly, various disclosed embodiments are suited for maintaining service continuity in multi-mode devices. In particular, unlike prior art solutions which interrupt user identity module software to implement changes to the network access software, various embodiments of the present disclosure perform user identity module software updates without interruption of ongoing services.

DETAILED DESCRIPTION OF EXEMPLARY EMBODIMENTS

Exemplary embodiments are now described in detail. While these embodiments are primarily discussed in the context of user identity-specific network access software, the present disclosure is in no way so limited. Various principles described herein may for example be adapted to efficiently perform other types of software updates without interruption of ongoing services.

Existing User Identity Module (UIM) Operation—

User identity authorization and authentication based access schemes are required for secure communication in most prior art wireless radio communication systems. As an example, one simple access scheme might include: (i) verifying the user identity of a communicating party (authentication), and (ii) granting a level of access commensurate with the verified identity (authorization). Within the context of one exemplary cellular system (e.g., Universal Mobile Telecommunications System (UMTS)), access control is controlled by an Universal Subscriber Identity Module (USIM) executing on a physical User Identity Module (UIM) (typically a Subscriber Identity Module (SIM) card). The USIM software authenticates the subscriber to the UMTS cellular network based on a unique and secure set of credentials associated with the user. After successful authentication, the subscriber is allowed access to the cellular network.

As used hereinafter, the term "user identity module (UIM)" refers generally to a logical entity (and associated credentials), either embodied within hardware or software, configured to control user device access to a network. Typically, a UIM is a physically distinct smart card that contains subscription specific information associated with a subscriber (user) which can be inserted into a subscriber agnostic device. While removable smart card based UIM are currently popular, it is recognized that UIM can be embodied as a fixed component of a device or flexibly loaded e.g., within software.

Figure 1:
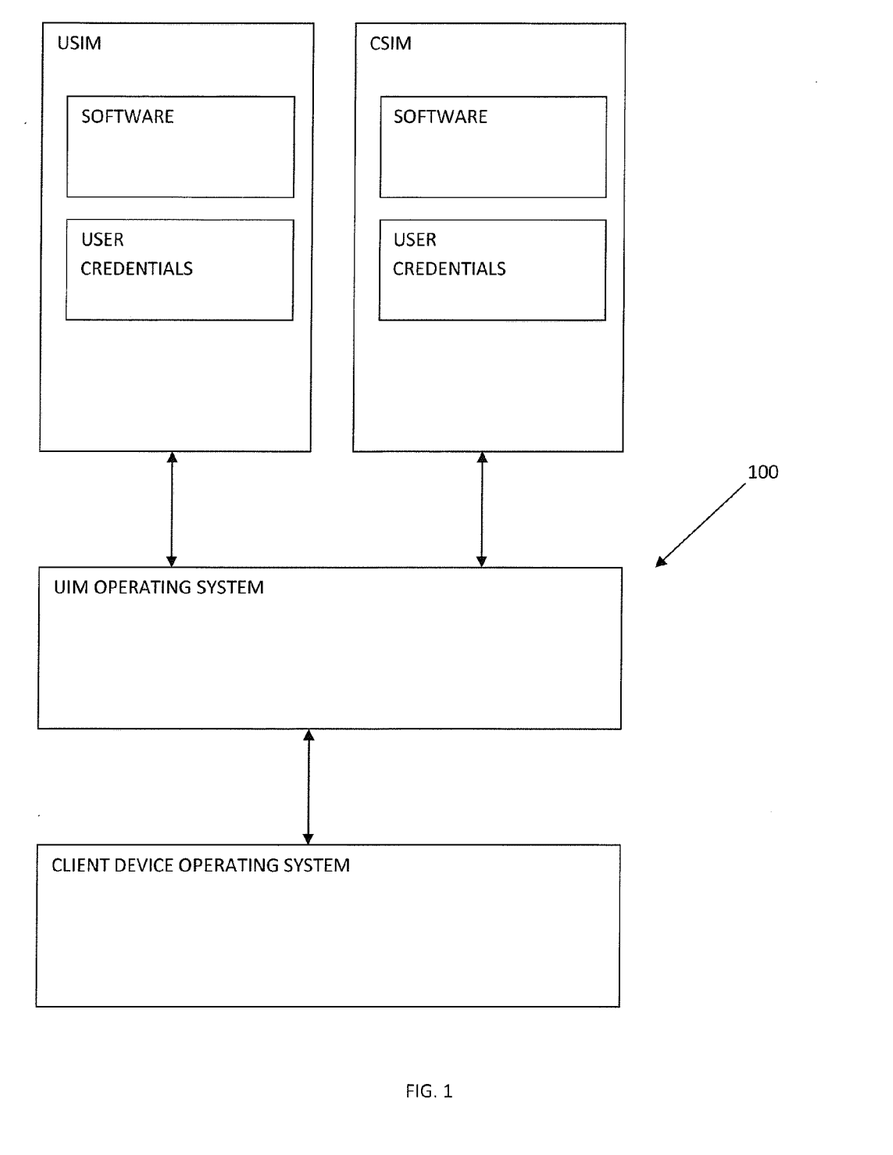
FIG. 1 is a graphical representation of an exemplary user identity module (UIM) software architecture.

FIG. 1 is a graphical representation of UIM software architecture 100. As shown, the UIM can execute a variety of applications which include, inter alia, the aforementioned USIM, CDMA Subscriber Identification Modules (CSIM), IP Multimedia Services Identity Module (ISIM), Subscriber Identity Modules (SIM), Removable User Identity Modules (RUIM), etc. Generally, UIM software additionally includes other software elements and components necessary for operation e.g., Card Application Toolkit (CAT), Javacard™ based Operating System (OS), etc.

Consider a subscriber which purchases a new cellular device from a storefront or kiosk; generally, the subscriber receives the cellular device and a provisioned (or unprovisioned) UIM smart card. During the provisioning process, the subscriber is activated and associated with credentials for the relevant network. For example, in a Universal Mobile Telecommunications System (UMTS) cellular network, the subscriber is uniquely associated with e.g., an International Mobile Subscriber Identity (IMSI), an Integrated Circuit Card Identifier (ICCID), a cryptographic key ($K_c$), a Public Local Mobile Network Operator (OPLMN), a Mobile Device Number (MDN), etc. Traditionally, UIM provisioning is performed via e.g., Short Message Service Point-to-Point (SMS-PP), Over the Air Service Provisioning (OTASP), Open Mobile Alliance™ Device Management (OMADM), Bearer Independent Protocol (BIP), etc. Regardless of the particular provisioning scheme, the provisioning process updates the UIM software using a secure channel via UIM commands.

As a brief aside, during normal operation, the UIM is a logically distinct entity from the mobile device. In particular, the UIM executes from a secure processor, a secure set of instructions, which are not accessible to the mobile device's processor. For example, commonly used UIM commands include, inter alia, OPEN CHANNEL, ENVELOPE, CLOSE CHANNEL, SEND DATA, RECEIVE DATA, etc. (see for example: (i) ETSI TS 102 223 V9.0.0 (2009-10) Smart Cards; Card Application Toolkit (CAT) (Release 9), (ii) 3GPP2

C.S0035-A CDMA Card Application Toolkit (CCAT), and (iii) Characteristics of the Universal Subscriber Identity Module (USIM) application (Release 9) each of the foregoing being incorporated herein by reference in its entirety).

Referring back to the provisioning scheme, once the UIM software has been updated, the device must refresh the updates according to a UIM REFRESH command which is proactively provided by the UIM to the device. Existing REFRESH commands are Network Access Application (NAA) Initialization, NAA File Change Notification, NAA Initialization and File Change Notification, NAA Initialization and Full File Change Notification, UICC Reset, NAA Application Reset, NAA Session Reset. Responsive to receiving the REFRESH command from the UIM, the device checks the downloaded file (if necessary), and processes the REFRESH command.

Unfortunately, during REFRESH operation, existing mobile devices terminate all running services. Traditionally, mobile devices were only associated with a single Radio Access Technology (RAT), thus REFRESH "blanket" terminations were an acceptable mechanism to ensure that the mobile device quickly instituted the updated UIM capabilities. However, with the recent popularity in multi-mode (multi-RAT) mobile devices, such blanket terminations will interrupt ongoing services, even where the UIM updates are intended for inactive networks.

Methods—

Figure 2:
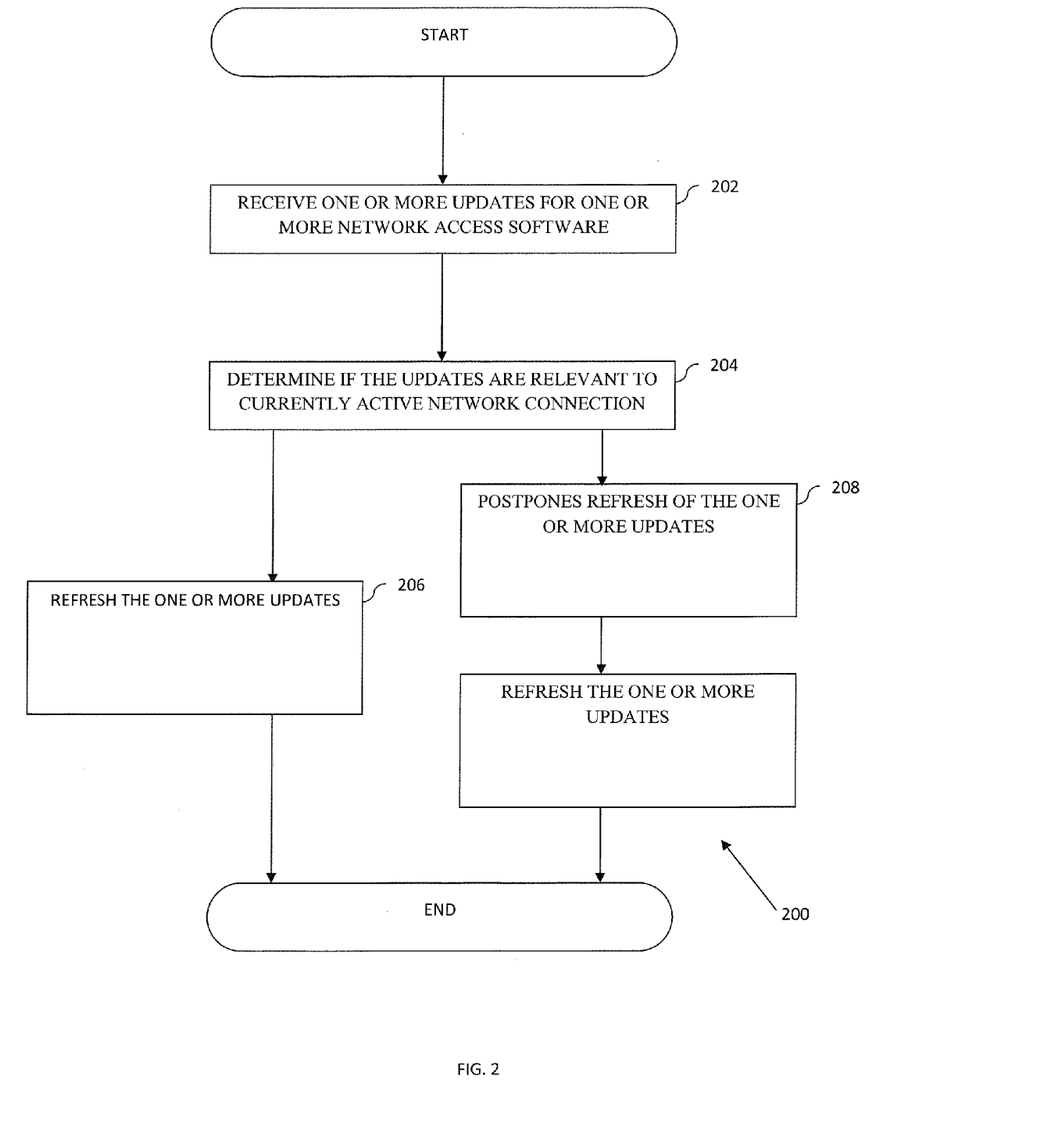
FIG. 2 is a logical flow diagram of one embodiment of a generalized method for performing user identity module software updates without interruption of ongoing services.

Referring now to FIG. 2, one embodiment of a generalized method 200 for performing user identity module software updates without interruption of ongoing services is disclosed. In one implementation, a subscriber device is assembled with a User Identity Module (UIM) which includes multiple applications associated therewith. Each of the multiple applications is configured to enable access control protocols with one or more networks. Within this context, responsive to receiving an update for a first application associated with at least a first network, the exemplary mobile device will not detach from a second network, provided the update is not associated with the second network. For example, if a UIM update procedure is triggered for a Network Access Application (NAA) other than a currently used NAA associated with an active connection to a cellular network, the device will postpone the refresh command for the unused NAA once the active connection has been terminated.

At step 202 of the method 200, the device receives one or more updates for one or more network access software. In one exemplary embodiment, the one or more updates are received via the currently active network connection. For example, a subscriber that is connected to an LTE network can receive updates for one or more Network Access Applications (NAAs), where the NAAs are configured for storage on, and execution from, a User Identity Module (UIM). In one exemplary variant, the UIM is a smart card that includes a secure processor and a secure set of software which has been physically hardened to prevent tampering and/or other malicious activity; however, it will be appreciated that other types of devices and/or form factors may be used consistent with the principles described herein.

Common examples of NAA include without limitation: Subscriber Identity Module (SIM), Universal SIM (USIM), CDMA SIM (CSIM), IP Multimedia Services Identity Module (ISIM), Removable User Identity Module (RUIM), electronic Subscriber Identity Module (eSIM), etc. Each NAA is further configured to include one or more software protocols configured to authenticate the UIM to an associated network, based on network specific security exchanges and security credentials. For example, a USIM is uniquely configured to initiate and respond to 3GPP Authentication and Key Agreement (AKA) protocols with associated 3GPP networks (which include e.g., Long Term Evolution (LTE), Wideband Code Division Multiple Access (WCDMA), Global System for Mobile Communications (GSM), etc.). Similarly, a CSIM is uniquely configured to initiate and respond to 3GPP2 Authentication and Key Agreement (AKA) protocols with associated 3GPP2 networks (which include e.g., Code Division Multiple Access 2000 (CDMA2000), Evolution Data Optimized (EV-DO), Enhanced High Rate Packet Data (eHRPD), etc.).

Common examples of updates include changes to, inter alia: software, protocols, subscriber credentials, and network credentials. For instance, updates may include changes to: an International Mobile Subscriber Identity (IMSI), an Integrated Circuit Card Identifier (ICCID), a cryptographic key (Kc), a Public Local Mobile Network Operator (OPLMN), a Mobile Device Number (MDN), etc.

In other embodiments, the one or more updates are provided to the device via the inactive network (or yet other networks), and the device must switch over to the inactive network responsive to a notification message received via the active network. For example, a device may receive a message via its current LIE network connection indicating that a CDMA2000 CSIM update is available, responsively the device changes to the CDMA2000 network to receive and update its CSIM application.

In still other embodiments, the one or more updates are provided to the device via an out-of-band method. Common examples include, inter alia: updates received from desktop synchronization software (e.g., synchronization with iTunes™ software, developed by the Assignee hereof), updates received from software updates performed by the user, etc.

At step 204 of the method 200, the device determines if the one or more updates are relevant to at least one currently active network connection. In one exemplary embodiment, the relevance is based on a fixed assumption. For example, generally a mobile device may safely assume that an NAA which is associated with a 3GPP network will not affect a 3GPP2 connection and vice versa. In some cases, updates to NAA may even be further limited to the appropriate Radio Access Technology (RAT); for instance, an updated GSM SIM does not affect a UMTS USIM, or an updated CDMA2000 CSIM may not affect an EV-DO CSIM.

In other embodiments, relevance is based on one or more parameters provided in conjunction with the updates (or which are otherwise logically associated with the updates). For example, a first NAA may be delivered with additional data (e.g., metadata) which indicates if the first NAA is dependent upon other NAAs; or if other NAAs depend from the first NAA. In some variants, dependence is based on e.g., business arrangements, network operation requirements, software application requirements, subscription requirements, etc.

At step 206 of the method 200, if the one or more updates are relevant to at least one currently active network connection, then the device refreshes the one or more updates. In one exemplary implementation, only affected active network connections are terminated. In other implementations, all network connections (affected or unaffected) are terminated during the refreshing operation.

During refresh operation, the device programs the one or more updates into the UIM. Generally refresh operation may replace the network access software, either in whole or in part. For example, a LTE USIM NAA can be replaced with patches (only a portion of the NAA is changed), or with an entirely new USIM. Similarly, a NAA may not be updated with new credentials. Common examples of credentials include for example, subscription information, subscription rules, user cryptographic material (tokens, certificates, keys, etc.), network cryptographic material (tokens, certificates, keys, etc.), etc.

At step 208 of the method 200, if the one or more updates are not relevant to at least one currently active network connection, then the device postpones refreshing the one or more updates. Specifically, if based on the determination of step 206 the updates are not relevant to the currently active network connection, then the device can continue operation without refreshing the one or more updates. Unlike prior art solutions which terminate the existing connection regardless of the utility of the update to the current operational session, various implementations of the present disclosure ensure that the update is actually required before terminating any current data sessions.

Alternately, at step 208 of the method 200, if the one or more updates are not relevant to at least one currently active network connection, then the device does not terminate any currently active network connections while refreshing the one or more updates. In particular, simultaneous operation can be performed, wherein a refresh can be performed via background processes without interruption of ongoing programs. Typically, this requires that the UIM itself is capable of maintaining multiple currently running contexts (i.e., that the UIM is capable of running a first network access software, while simultaneously refreshing a second network access software), although other schemes for performing such simultaneous operation are readily appreciated by those of ordinary skill in the related arts, given the contents of the present disclosure.

Those of ordinary skill in the related arts will recognize that the various embodiments described herein are suited for maintaining service continuity in multi-mode devices. In particular, unlike prior art solutions which must interrupt user identity module software to implement changes to the network access software, various disclosed embodiments can postpone unnecessary updates, or otherwise schedule their implementation so as to mitigate impact on service or user experience.

Exemplary Client Apparatus—

Figure 3:
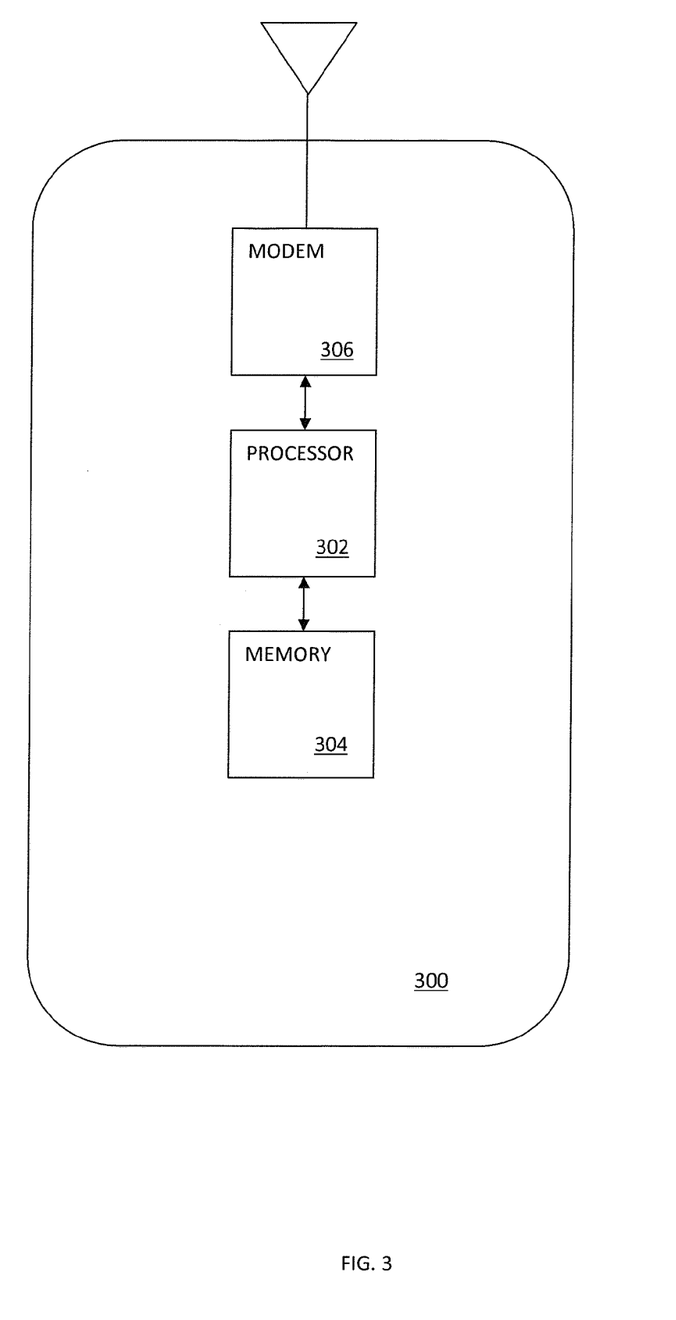
FIG. 3 is a logical block diagram of one exemplary user device apparatus configured to perform user identity module software updates without interruption of ongoing services.

Referring now to FIG. 3, an exemplary user device apparatus 300 configured according to the present disclosure (i.e., to perform user identity module software updates without interruption of ongoing services) is shown and described. As used herein, the term "user device" includes, but is not limited to cellular telephones, smart phones (such as for example an iPhone™ manufactured by the Assignee hereof), handheld computers, tablets, personal media devices (PMDs), or any combinations of the foregoing. While a specific device configuration and layout is shown and discussed, it is recognized that many other implementations may be readily implemented by one of ordinary skill given the present disclosure, the apparatus 300 of FIG. 3 being merely illustrative of the broader principles of described herein.

The processing subsystem 302 includes one or more of central processing units (CPU) or digital processors, such as a microprocessor, digital signal processor, field-programmable gate array, RISC core, a baseband processor, or plurality of processing components mounted on one or more substrates. In some embodiments, one or more of the above-mentioned processors (e.g. the baseband processor) are further configured to implement the software update methods or protocols described previously herein.

The processing subsystem is coupled to non-transitory computer-readable storage media such as memory 304, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown processing subsystem 302 includes discrete components; however, it is understood that in some embodiments they may be consolidated or fashioned in a SoC (system-on-chip) configuration.

The apparatus 300 further includes one or more wireless interfaces 306 which are configured to transmit and receive signaling.

In one exemplary embodiment, the non-transitory computer-readable storage media includes instructions which when executed by the processor: receive one or more updates for one or more network access software; determine whether the one or more updates are relevant to at least one currently active network connection; and when the one or more updates are relevant to at least one currently active network connection, refresh the one or more updates. Otherwise, when the one or more updates are not relevant to at least one currently active network connection, the refresh of the one or more updates is postponed.

The foregoing instructions may also be configured to, when executed, receive one or more updates for one or more network access software, and determine whether the one or more updates are relevant to at least one currently active network connection. When the one or more updates are relevant to at least one currently active network connection, the one or more updates are refreshed; otherwise, when the one or more updates are not relevant to at least one currently active network connection, any currently active network connections are not terminated, and the one or more updates are refreshed.

Exemplary User Identity Module (UIM) Apparatus—

Figure 4:
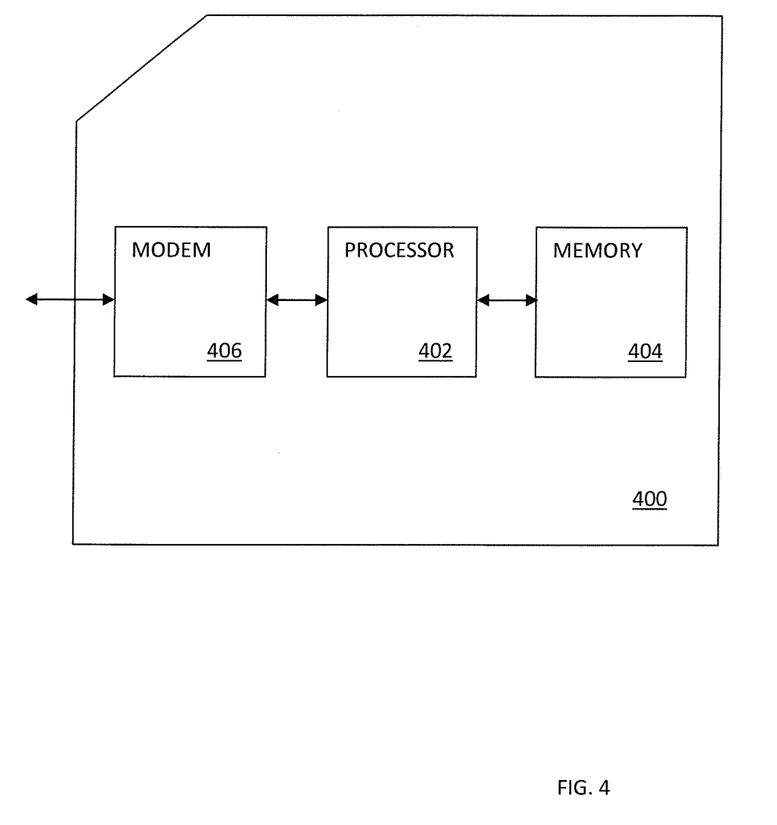
FIG. 4 is a logical block diagram of one exemplary user identity module (UIM) apparatus configured to accept software updates without interruption of ongoing services.

Referring now to FIG. 4, an exemplary user identity module (UIM) apparatus 400 configured to accept software updates without interruption of ongoing services is illustrated. As used herein, the term "user identity module" includes, but is not limited to smart cards, secure elements, programmable processors, etc. or any combinations of the foregoing. While a specific device configuration and layout is shown and discussed, it is recognized that many other implementations may be readily implemented by one of ordinary skill given the present disclosure, the apparatus 400 of FIG. 4 being merely illustrative of the broader principles described herein.

The processing subsystem 402 includes a secure processor mounted on a substrate. The processing subsystem is coupled to secure non-transitory computer-readable storage media such as memory 404, which may include for example SRAM, FLASH, SDRAM, and/or HDD (Hard Disk Drive) components. Typical implementations of the exemplary UIM 400 are a secure processor and secure memory encased in a protective resin to prevent external tampering and/or misuse.

The apparatus 400 further includes one or more interfaces 406 which are configured to receive/send transmissions from/to client devices. In one exemplary embodiment, the interface includes a smart card interface: (i) CLOCK, (ii) RESET, (iii) VCC, (iv) GND, (v) SWP (single wire protocol), and (vi) I/O (input output).

In one exemplary embodiment, the non-transitory computer-readable storage media includes instructions which when executed by the processor, execute one or more network access software configured to authenticate and/or authorize a user for access to a corresponding one or more networks. In one variant, the instructions are additionally configured to receive one or more updates for one or more network access software, and based on conditional input from the client device, the one or more updates for a first network are refreshed without interrupting operation of a second network.

Example Operation—

Example scenarios are now discussed. In the following exemplary operational scenarios, the user device includes: (i) Third Generation Partnership Project (3GPP) capabilities (which include e.g., Long Term Evolution (LTE), Wideband Code Division Multiple Access (WCDMA), Global System for Mobile Communications (GSM), etc.); (ii) Third Generation Partnership Project 2 (3GPP2) capabilities (which include e.g., Code Division Multiple Access 2000 (CDMA2000), Evolution Data Optimized (EV-DO), Enhanced High Rate Packet Data (eHRPD), etc.); and (iii) Internet Protocol (IP) Multimedia System (IMS) capabilities. The 3GPP capabilities are associated with a Universal Subscriber Identity Module (USIM/SIM), the 3GPP2 capabilities are associated with a CDMA SIM (CSIM/RUIM), and the IMS capabilities are associated with an IMS SIM (ISIM).

During normal operation, the User Identity Module (UIM) smart card securely executes each of the SIMs (USIM, CSIM, ISIM). Each SIM application can run independently of the other SIM applications; while the SIM applications do not share any computing dependencies, it is appreciated that certain SIM applications may be linked via business or contractual obligations (e.g., in some business arrangements an ISIM may be required for USIM or CSIM operation, and/or vice versa), or via other types of linkages.

First Example Scenario—

Figure 5:
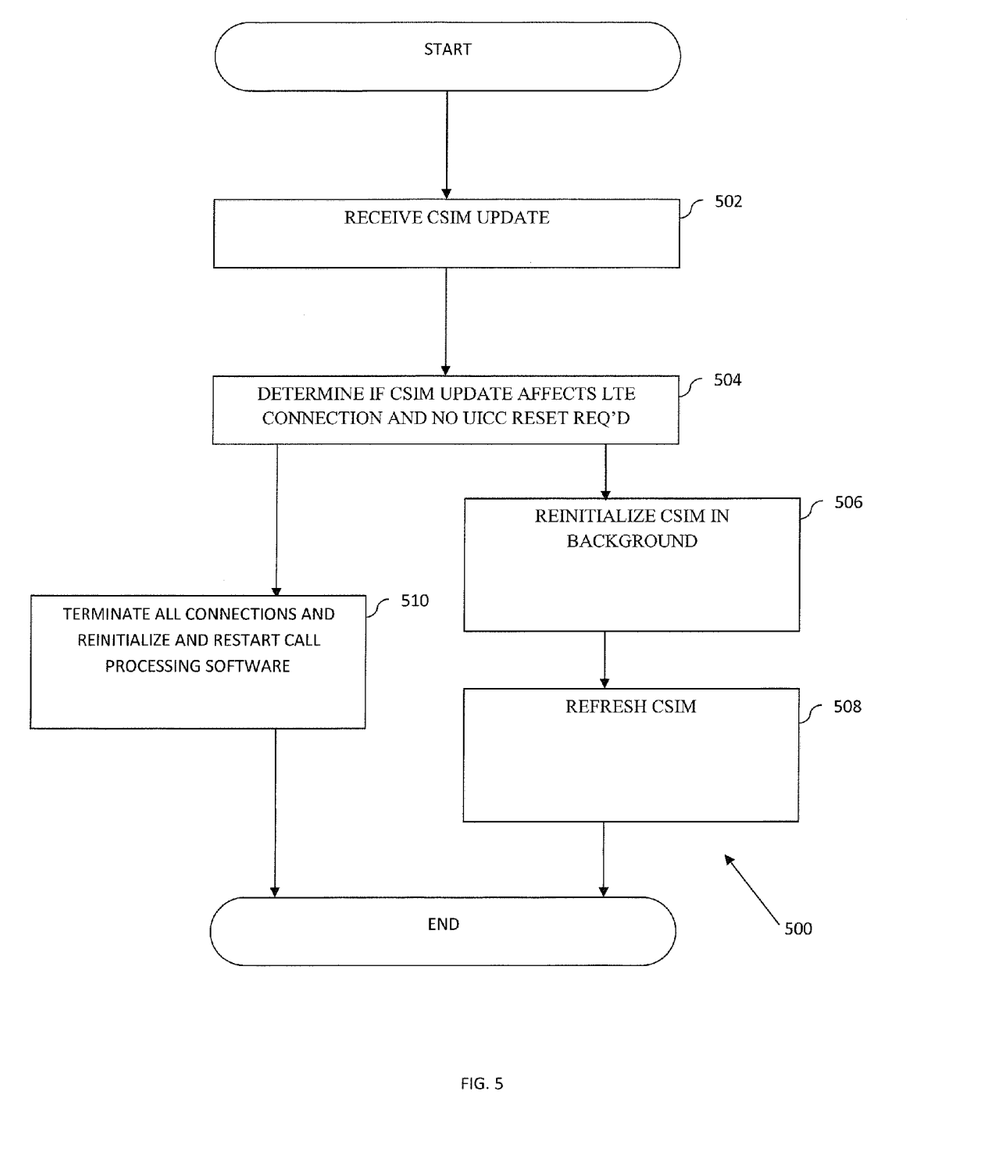
FIG. 5 is a logical flow diagram illustrating a first exemplary scenario, illustrating the various principles described in greater detail herein.

Consider the first exemplary scenario illustrated in FIG. 5, wherein the exemplary device is active on a 3GPP network and receives a request to update its 3GPP2 CSIM.

As shown in FIG. 5, the exemplary subscriber device receives an update for the CSIM associated with CDMA2000 networks via its existing 3GPP LTE network connection (step 502).

At step 504, the exemplary subscriber device determines if the CSIM update will affect its existing LTE network connection. In particular, the exemplary subscriber device additionally includes a controller module that monitors the current operations of each of the interfaces. As a brief aside, the controller module monitors the status of each of the interfaces (in this example, the controller module receives status from the LTE call stack software and the CDMA2000 call stack software), and has information regarding the current status of the call stacks (active, inactive, idle, connected, etc.).

Based on information provided by the controller module, and information provided with the CSIM update, the subscriber device can determine if existing operation will be affected by the CSIM update. Additionally, the subscriber device also verifies that the CSIM update does not require a full smart card reset (i.e., the refresh mode is not a UICC reset). For example, the CSIM update may be a new network certificate for CDMA2000 networks and is provided with metadata indicating that only CDMA2000 operation is affected by the contents of the update.

If the conditions of step 504 are both true, then at step 506, the mobile device reinitializes the CSIM application and corresponding call processing software, while the mobile device continues its existing LTE network connection.

At step 508, the mobile device refreshes the CSIM application. If the device has poor coverage at the end of the refresh procedure, then the device may additionally perform cell reselection with the newly updated CSIM application (not shown).

Otherwise, if either (or both) of the conditions of step 504 are not met, then the mobile device must terminate all connections to reinitialize the CSIM application, and restart all call processing software (step 510).

Second Example Scenario—

Figure 6:
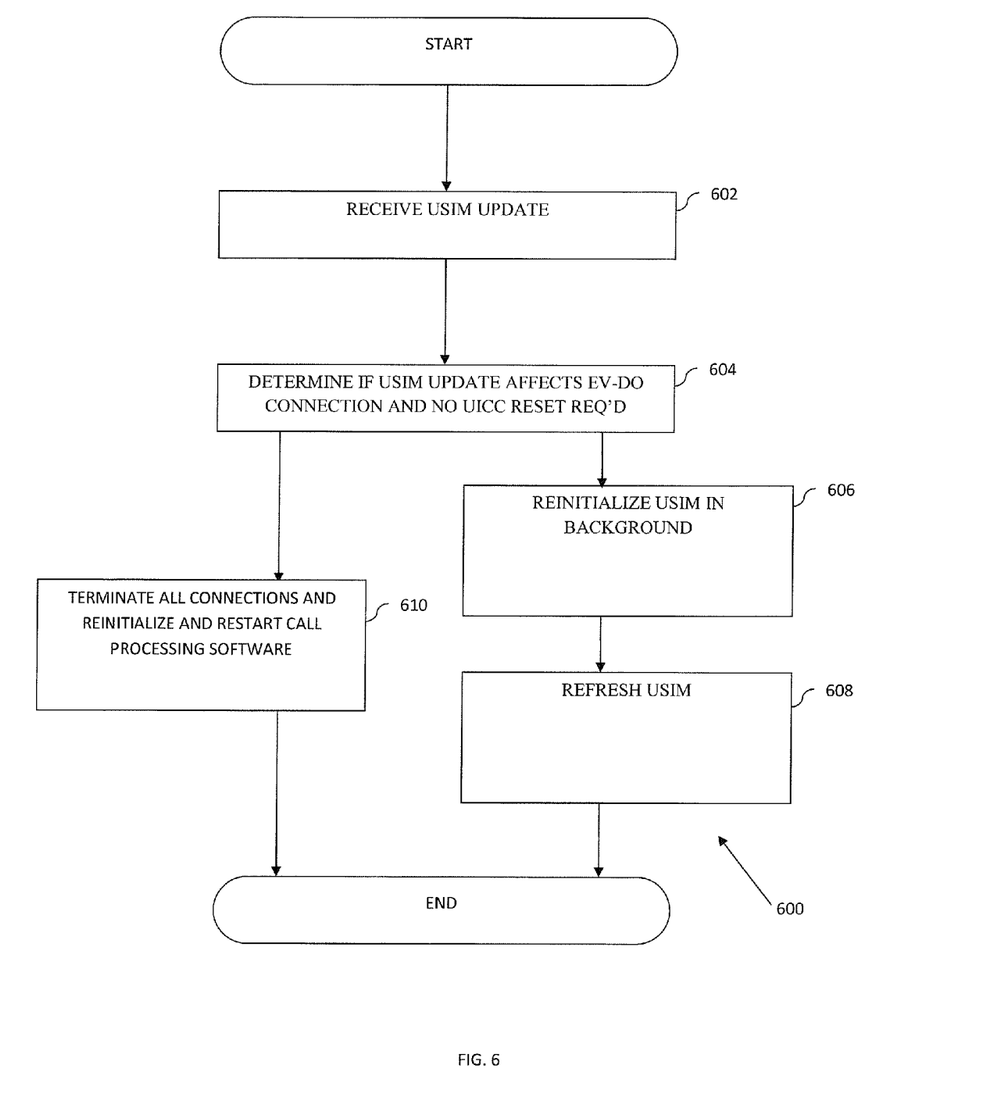
FIG. 6 is a logical flow diagram illustrating a second exemplary scenario, illustrating the various principles described in greater detail herein.

A second exemplary scenario is depicted within FIG. 6, wherein the exemplary device is active on a 3GPP2 network and receives a request to update its 3GPP USIM.

Similar to the scheme of FIG. 5, in FIG. 6 the exemplary subscriber device receives an update for the USIM associated with UMTS networks via its existing 3GPP2 EV-DO network connection (step 602).

At step 604, the exemplary subscriber device determines if the USIM update will affect its existing EV-DO network connection according to a controller module (see discussion of controller module above). Additionally, the subscriber device verifies that the USIM update does not require a full smart card reset (i.e., the refresh mode is not a UICC reset).

If the conditions of step 604 are both true, then at step 606, the mobile device reinitializes the USIM application and corresponding call processing software, while the mobile device continues its existing EV-DO network connection.

At step 608, the mobile device refreshes the USIM application. If the device has poor coverage at the end of the refresh procedure, then the device may additionally perform cell reselection with the newly updated USIM application (not shown).

Otherwise, if either (or both) of the conditions of step 604 are not met, then the mobile device must terminate all connections to reinitialize the USIM application, and restart all call processing software (step 610).

Third Example Scenario—

Figure 7:
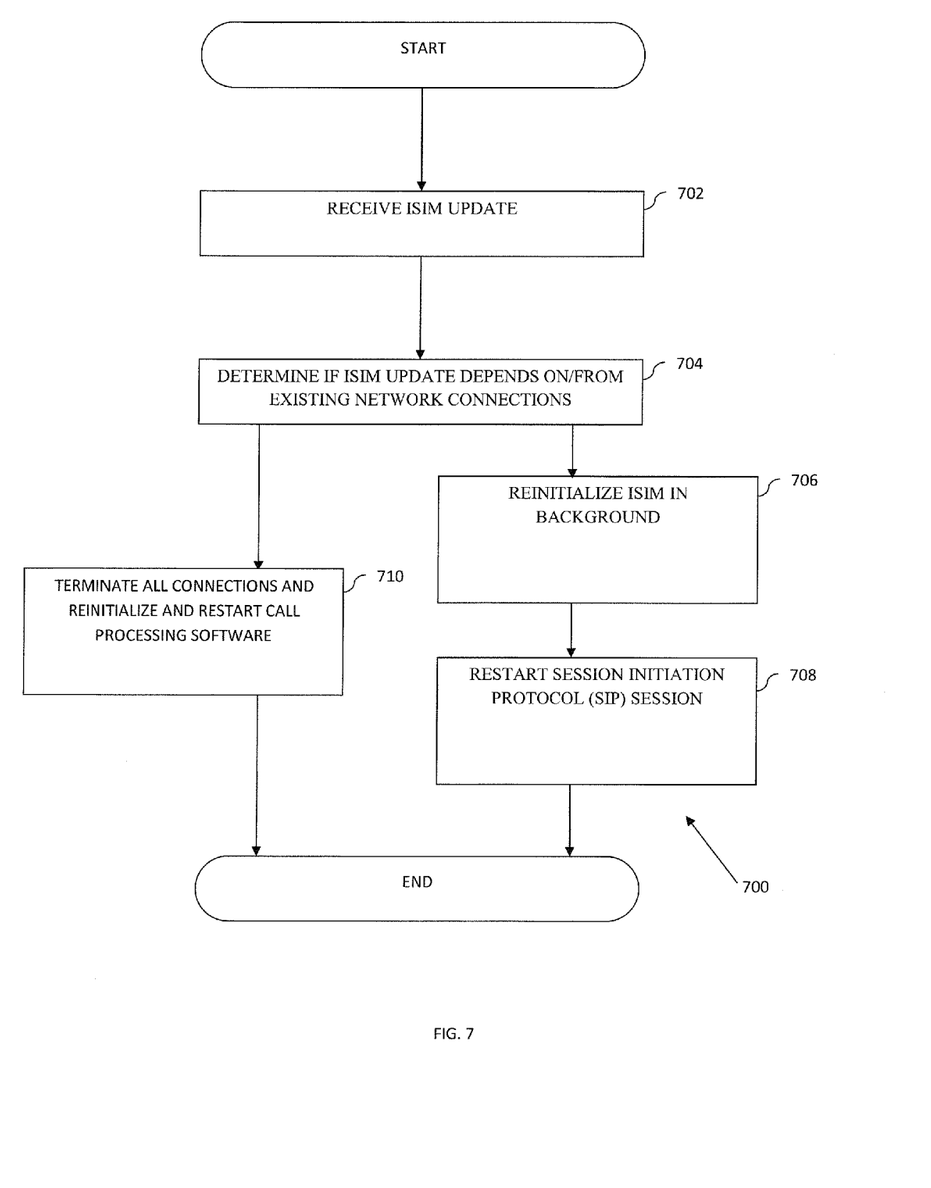
FIG. 7 is a logical flow diagram illustrating a third exemplary scenario, illustrating the various principles described in greater detail herein.

A third exemplary scenario is depicted within FIG. 7, wherein the exemplary device is active on either a 3GPP network and/or a 3GPP2 network and receives a request to update its ISIM.

Unlike the first scenario of FIG. 5 and the second scenario of FIG. 6, certain network operators may mandate IMS operation during 3GPP and/or 3GPP2. Accordingly, the ISIM updates must additionally determine if any existing business or network concerns additionally depend on, or depend from, the existing connections.

Accordingly, at step 702, the device receives an update for the ISIM associated with either the 3GPP or 3GPP2 networks.

At step 704, the exemplary subscriber device determines if the ISIM update is dependent upon the existing network connections, or if the ISIM update depends from the existing network connections.

If the conditions of step 704 are both true, then at step 706, the mobile device refreshes the ISIM application, and restarts a Session Initiation Protocol (SIP) session (step 708) without terminating any existing network connections.

Otherwise, if either (or both) of the conditions of step 704 are not met, then the mobile device must terminate all network connections, refresh the ISIM application, reacquire one or more appropriate networks, and restart a Session Initiation Protocol (SIP) session (step 710).

It will be recognized that while certain features are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles described herein.

What is claimed is:

1. A method of operating a network, the method comprising:
   maintaining a plurality of active network connections to a corresponding plurality of user devices;
   transmitting to at least one user device of the plurality of user devices one or more updates for at least one user identity module (UIM) software application associated with the at least one user device,
   wherein the transmitting causes each user device of the at least one user device to:
      refresh the one or more updates, when the one or more updates are relevant to at least one active network connection belonging to a set of active network connections between the user device and the network; and
      when the one or more updates are not relevant to any member of the set of active network connections between the user device and the network, refresh the one or more updates after connections of all members of the set of active network connections terminate.

2. The method of claim 1, further comprising:
   transmitting to the at least one user device one or more parameters with the one or more updates, wherein each user device of the at least one user device determines whether the one or more updates are relevant to the at least one active network connection belonging to the set of active network connections between the user device and the network based on the one or more parameters.

3. The method of claim 1, wherein the at least one UIM software application associated with the at least one user device is configured to cause the at least one user device to verify a user identity of a communicating party and to grant a level of access to one or more networks commensurate with the verified user identity.

4. A user apparatus comprising:
   a wireless transceiver configured to communicate with a wireless network;
   a processor;
   a storage device in communication with the processor; and
   computerized logic configured to accept software updates from the wireless network without interruption of one or more ongoing services, the logic configured to cause the user apparatus to:
      receive one or more updates for one or more user identity module (UIM) software applications;
      determine whether the one or more updates are relevant to at least one active network connection belonging to a set of currently active network connections between the user apparatus and the wireless network;
      when the one or more updates are not relevant to any member of the set of currently active network connections, refresh the one or more updates after connections of all members of the set of currently active network connections terminate; and
      otherwise, refresh the one or more updates.

5. The user apparatus of claim 4, wherein the user apparatus determines whether the one or more updates are relevant to the at least one active network connection based on a comparison of the at least one active network connection to a network connection on which the one or more updates were received.

6. The user apparatus of claim 4, wherein the user apparatus determines whether the one or more updates are relevant to the at least one active network connection based on one or more parameters provided with the one or more updates.

7. The user apparatus of claim 4, wherein the one or more UIM software applications are configured to run on at least a first context and a second context; and
   wherein the user apparatus refreshes the one or more updates on the first context and maintains the at least one active network connection on the second context.

8. The user apparatus of claim 7, wherein the user apparatus refreshes the one or more updates on the second context when the at least one active network connection terminates.

9. The user apparatus of claim 4, wherein the computerized logic is configured to cause the user apparatus to refresh the one or more updates without disabling any active network interfaces of the user apparatus that are not associated with the one or more updates.

10. The user apparatus of claim 1, wherein the one or more UIM software applications are configured to cause the user apparatus to verify a user identity of a communicating party and to grant a level of access to one or more networks commensurate with the verified user identity.

11. A network apparatus comprising:
    a wireless transceiver configured to communicate with a plurality of user devices;
    a processor;
    a storage device in communication with the processor; and
    computerized logic configured to provide software updates to the plurality of user devices without interrupting one or more ongoing services, the computerized logic configured to cause the network apparatus to:
       maintain a plurality of active network connections to a corresponding plurality of user devices;
       transmit to at least one user device of the plurality of user devices one or more updates for at least one user identity module (UIM) software application associated with the at least one user device;
       wherein transmission of the one or more updates causes each user device of the at least one user device to:
          refresh the one or more updates when the one or more updates are relevant to at least one active network connection belonging to a set of active network connections between the user device and the network apparatus; and
          when the one or more updates are not relevant to any member of the set of active network connections between the user device and the network apparatus, refresh the one or more updates after connections of all members of the set of active network connections terminate.

12. The network apparatus of claim 11, wherein the computerized logic is further configured to cause the network apparatus to:
    transmit to the at least one user device one or more parameters with the one or more updates, wherein each user device of the at least one user device determines whether the one or more updates are relevant to the at least one active network connection belonging to the set of active network connections between the user device and the network apparatus based on the one or more parameters.

13. The network apparatus of claim 11, wherein the at least one UIM software application associated with the at least one user device is configured to cause the at least one user device to verify a user identity of a communicating party and to grant a level of access to one or more networks commensurate with the verified user identity.

14. A non-transitory computer readable apparatus for use in a network apparatus, the non-transitory computer readable apparatus comprising a plurality of instructions that, when executed by a digital processor, cause the network apparatus to:
- maintain a plurality of active network connections between the network apparatus and a corresponding plurality of user devices; and
- transmit to a user device of the plurality of user devices one or more updates for at least one user identify module (UIM) software application associated with the user device, wherein transmission of the one or more updates causes the user device to:
- refresh the one or more updates, when the one or more updates are relevant to at least one active network connection belonging to a set of active network connections between the user device and the network apparatus; and
- when the one or more updates are not relevant to any member of the set of active network connections between the user device and the network apparatus, refresh the one or more updates after connections of all members of the set of active network connections terminate.

15. The non-transitory computer readable apparatus of claim 14, wherein the one or more updates are provided to the user device via an inactive network connection between the network apparatus and the user device, and the user device receives a notification message via an active network connection between the network apparatus and the user device, the notification message indicating availability of the one or more updates.

16. The non-transitory computer readable apparatus of claim 14, wherein the at least one UIM software applications is configured to cause the user device to verify a user identity of a communicating party and to grant a level of access to one or more networks commensurate with the verified user identity.

* * * * *